R. T. NEWTON.
BRACKET.
APPLICATION FILED JULY 11, 1917.

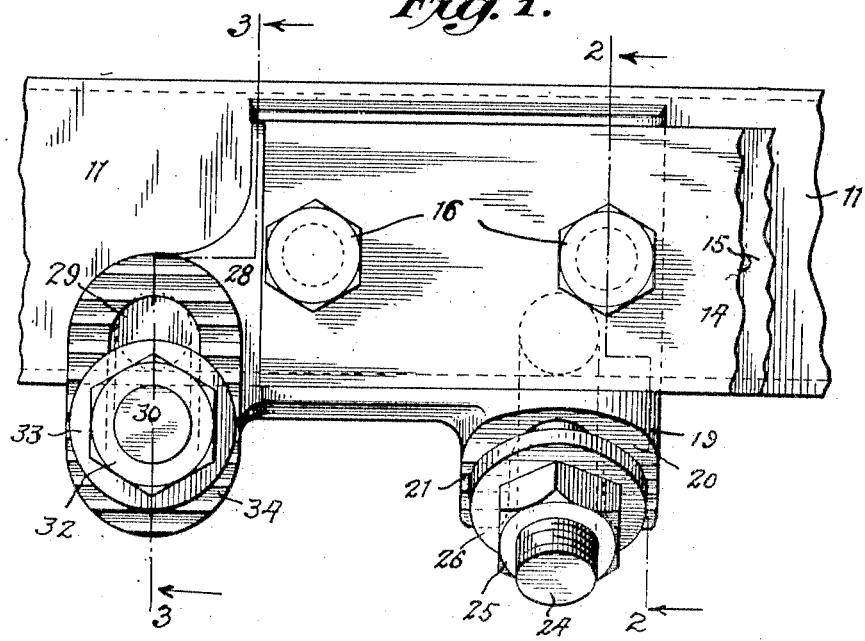
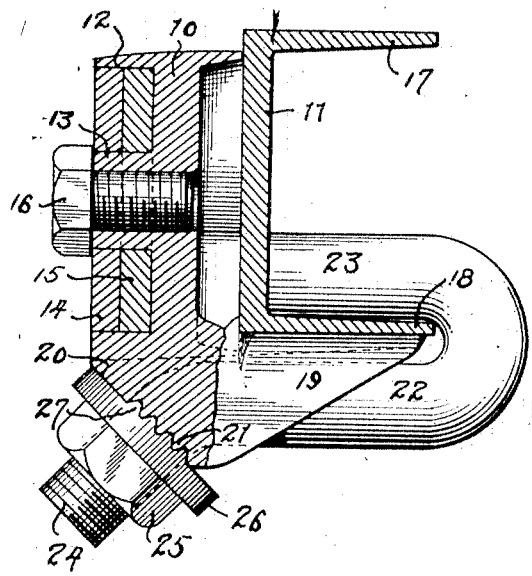
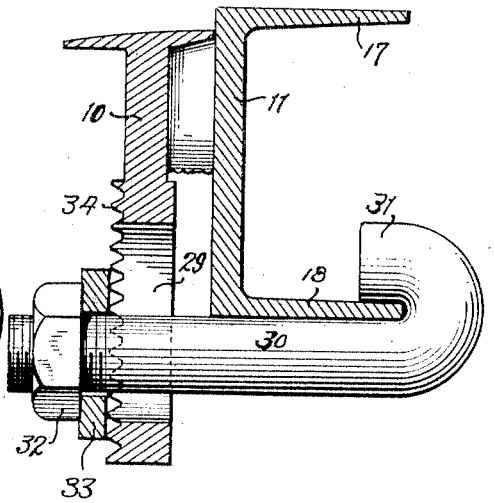

1,315,789.

Patented Sept. 9, 1919.
2 SHEETS—SHEET 2.

INVENTOR
RICHARD T. NEWTON
BY
ATTORNEYS.

UNITED STATES PATENT OFFICE.

RICHARD T. NEWTON, OF NEW YORK, N. Y.

BRACKET.

1,315,789.   Specification of Letters Patent.   Patented Sept. 9, 1919.

Application filed July 11, 1917. Serial No. 179,870.

*To all whom it may concern:*

Be it known that I, RICHARD T. NEWTON, a citizen of the United States of America, and residing at New York, in the county of N. Y. and State of New York, and having a post-office address at 6–8 West 62nd street, New York city, New York, have invented a certain new and Improved Bracket, of which the following is a specification.

My invention relates to brackets and particularly to brackets for carrying automobile bumpers, the object of my invention being to provide a suitable bumper carrier which may be clamped to the chassis side bar without injury to the latter, and, at the same time, afford a rigid mounting for the bumper. Preferably also, the device affords means by which vertical adjustment of the bumper may be secured.

Referring to the accompanying drawings—

Figure 1 is a side elevation of a bracket associated with a chassis side bar and bumper end.

Fig. 2 is a section on the line 2—2, Fig. 1.

Fig. 3 is a section on the line 3—3, Fig. 1.

Figure 4:
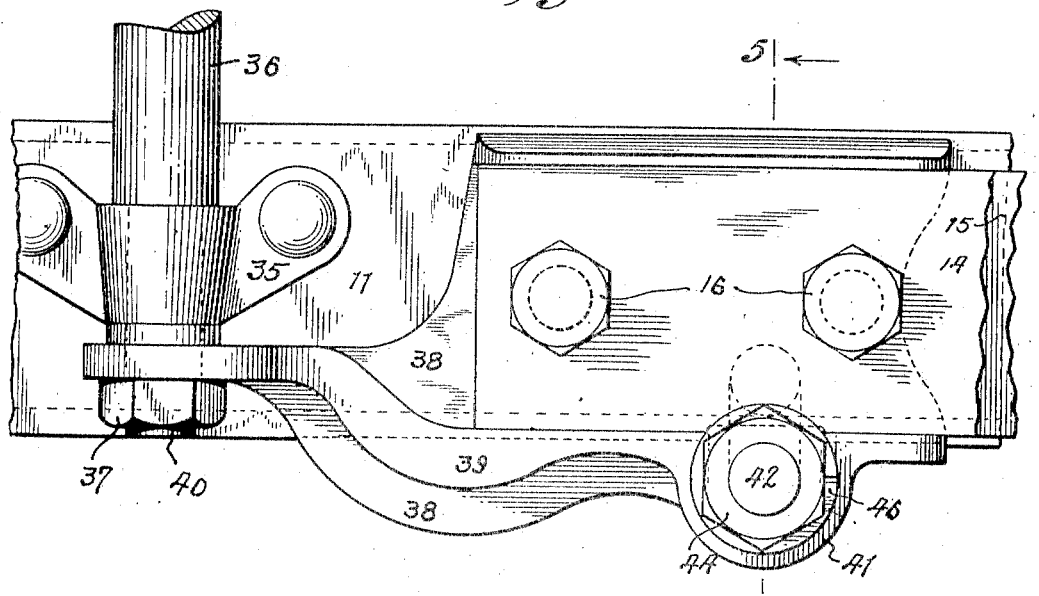
Fig. 4 is a side elevation of a modified construction bracket.

The present bracket is particularly designed for carrying bumpers of the leaf spring type, such as that shown in my copending application, Serial No. 143,815, but it embodies various features which may be utilized to advantage in brackets for carrying bumpers of other types. As here shown, however, the bracket comprises a base plate 10 adapted to lie against the vertical side of the chassis side frame 11 and provided at its outer face with a channel 12 and central studs 13 therein. Within the channel 12 are accommodated the ends 14 and 15 of the two leaf springs which jointly form the bumper described in my co-pending application above referred to. The ends of these springs are perforated at suitable points to pass over the studs 13, so that they lie against the bottom of the channel 12 and are held in position by screw bolts 16 which take into the tapped bores of the studs 13.

In many cases the arrangement of the fore parts of the automobile body are such that it is not convenient to support the bracket from the upper flange 17 of the chassis frame bar 11. I have, therefore, provided clamping means for the bracket which engage only the lower flange 18 of the bar 11, and have so shaped these clamping means that not only is the bracket firmly secured in position, but angular adjustment is possible in order properly to locate the bumper at the front of the car. To this end, I have provided the forward lower end of the bracket with a foot piece 19, which, at its inner end underlies the lower flange 18 of the chassis bar, while at its outer end it is inclined at an angle of approximately 45° to the base plate 10 of the bracket. This inclined face 20 has serrations 21 formed therein. Lying in this foot piece 19, which is of U-shape in cross section, is the forward clamping bolt 22 with hooked end 23 overlying the lower flange 18 of the chassis bar and extending inward to the lower inside corner of the channel while the outer end 24 of the clamping bolt is similarly inclined at substantially 45° to the body of the bolt so that it projects at approximately right angles to the face 20 of the foot piece. This outer end 24 is threaded, and a securing nut 25 is screwed thereon and holds an interposed washer 26, having serrations 27, in engagement with the serrated face of the foot piece 19. It is obvious that by inclining this bolt end 24 at an angle substantially bisecting that subtended between the body plate 10 and foot piece 19 of the clamp, the pressure exerted by the bolt 22 is such that it not only draws the bracket firmly against the side of the channel 11, but also supports the upper portion of the bracket against any tendency to fall away. At the rear of the bracket, a depending wing 28, lying beyond the end of the channel 12, extends below the lower flange 18 of the channel 11 and has a vertical slot 29 through which passes the shank 30 of the rear securing hook bolt, the inner end 31 of which overlies the lower flange 18, while the outer threaded end carries the clamping nut 32 which holds the serrated washer 33 in engagement with the serrated face 34 of the wing piece 28. By loosening this bolt and the bolt 22, the bracket may be pivoted on the bolt 22 to secure the vertical adjustment of the bumper with relation to the chassis. It is plain that although the bracket is secured only to the lower flange 18 of the chassis side bar, it is firmly supported on the chassis, and, at the same time, has freedom of vertical adjustment for the bumper.

Figure 5:
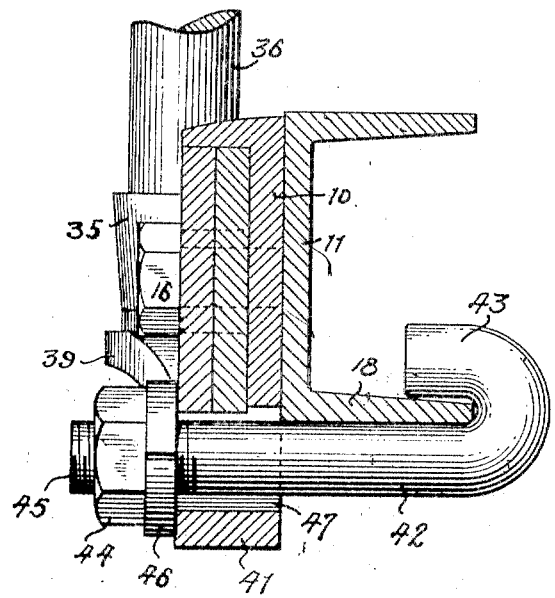
Fig. 5 is a section on the line 5—5, Fig. 4.

In the modified construction shown in Figs. 4 and 5, I have adapted the bracket to a type of chassis construction in which the side bar 11 carries a foot piece 35 for the mud guard prop 36, the latter extending below the foot piece 35 and being threaded to receive a holding nut 37. The body of the bumper bracket 38 is still made of channel section to receive the ends of the bumper springs 14 and 15, and the latter are secured by screw bolts 16 taking into tapped bosses 13 over which the perforated spring ends pass. The lower flange 39 of the bracket is extended rearwardly together with portion of the web of the bracket, as a stiffener, and is perforated to fit over the threaded lower end 40 of the mud guard prop, so that the securing nut 37 therefor may be utilized to hold the bracket in position at this point. At the forward portion of the bracket, a bay 41 is formed in the lower flange 39 and the bracket web is pierced at 47 to permit the passage therethrough of the forward securing bolt 42, the hook end 43 of which overlies the lower flange of the channel 11. A securing nut 44 threads on the tapped outer end 45 of the bolt 42 and presses a lock washer 46 into engagement with the bayed portion 41 of the lower flange 39 of the bracket. The aperture 47 through which the bolt passes is of sufficient vertical height to permit slight vertical adjustment of the bracket, but it is obvious that no great angular adjustment is possible in view of the nature of the attachment at the rear end of the bracket.

Various modifications will readily occur to those skilled in the art which do not depart from what I claim as my invention.

I claim:

1. A bumper bracket having means for supporting a bumper thereon and means arranged below the bumper element engaged by the bracket for clamping the bracket against the web of a chassis side bar of channel section, said clamping means comprising draw-up means passing transversely of the side bar and only beneath the latter.

2. A bumper bracket having means for supporting a bumper thereon and means arranged below the bumper element engaged by the bracket for clamping the bracket against the web of a chassis side bar of channel section, said clamping means comprising a hook bolt passing transversely beneath the side bar and engaging only the lower flange of said channel bar.

3. A bumper bracket having a channeled face to receive the bumper end, means arranged below the bumper element engaged by the bracket for securing said bumper end in said channel, together with means for clamping the bracket to the web of a chassis side bar of channel section, said clamping means passing transversely of the side bar and only beneath the latter.

4. A bumper bracket having means for supporting a bumper thereon and means arranged below the bumper element engaged by the bracket for clamping the bracket against the web of a chassis side bar of channel section, said means comprising draw-up means passing beneath the chassis side bar and engaging the latter, said draw-up means having a vertical as well as horizontal supporting component.

5. A bumper bracket having means for supporting a bumper thereon and means for clamping the bracket against the web of a chassis side bar of channel section, said means comprising draw-up means passing beneath the chassis side bar and engaging the latter, said draw-up means exerting its effort in a direction subdividing the angle subtended between the web and the lower flange of the chassis side bar.

6. A bumper bracket having means for supporting a bumper thereon and means for clamping the bracket against the web of a chassis side bar of channel section, said means comprising draw-up means passing beneath the chassis side bar and engaging the latter, said draw-up means exerting its effort in a direction approximately bisecting the angle subtended between the web and the lower flange of the chassis side bar.

7. A bumper bracket comprising a base adapted to lie against the web of a chassis side bar of channel section, and a foot piece adapted to pass beneath the lower flange of said side bar, together with draw-up means having its clamping effort exerted in a direction subdividing the angle subtended between said base and said foot piece to hold both of the latter firmly against the chassis side bar.

8. A bumper bracket comprising a base adapted to lie against the web of a chassis side bar of channel section, and a foot piece adapted to pass beneath the lower flange of said side bar, said foot piece having its outer face inclined substantially at right angles to a line bisecting the angle subtended between said base and said foot piece, together with a draw-up member engaging the side bar and bearing against said inclined face.

9. A bumper bracket comprising a base adapted to lie against the web of a chassis side bar of channel section, and a foot piece adapted to pass beneath the lower flange of said side bar, said foot piece having its outer face inclined substantially at right angles to a line bisecting the angle subtended between said base and said foot piece, together with a draw-up hook bolt passing beneath the chassis side bar and engaging with its hook end the lower inside corner of said bar, and having its outer end bent substantially at right angles to said inclined face, and a nut screwed on said bolt and bearing against said inclined face.

10. A bumper bracket comprising a base adapted to lie against the web of a chassis side bar of channel section, and a foot piece adapted to pass beneath the lower flange of said side bar, said foot piece having its outer face inclined substantially at right angles to a line bisecting the angle subtended between said base and said foot piece, together with a drawup hook bolt passing beneath the chassis side bar and engaging with its hook end the lower inside corner of said bar, and having its outer end bent substantially at right angles to said inclined face, and a nut screwed on said bolt and bearing against said inclined face, together with a washer between said nut and said inclined face, said washer and inclined face being serrated.

11. A bumper bracket having means for supporting a bumper thereon, and means for clamping the bracket against the web of a chassis side bar of channel section, said clamping means comprising draw-up means passing transversely of the chassis side bar and only beneath the latter, together with means for securing angular vertical adjustment of the bracket on the chassis.

12. A bumper bracket having means for supporting a bumper thereon, and means for clamping the bracket against the web of a chassis side bar of channel section, said clamping means comprising a pair of hook bolts passing only beneath the chassis side bar and engaging the lower flange of said side bar, together with means for securing vertical angular adjustment of the bracket with relation to one of said bolts.

13. A bumper bracket having means for supporting a bumper thereon and means for securing the bracket to a chassis side bar having a bottom flange, said means comprising a plurality of supports lying below the upper surface of the side bar and serving to hold the bracket base in a plane substantially parallel to the side of the chassis side bar, at least one of said supports comprising draw-up means passing beneath said chassis side bar and engaging the lower flange thereof with a clamping action.

14. A bumper bracket comprising a base adapted to lie against the web of a chassis side bar, a foot piece adapted to pass beneath the lower flange of said side bar, said foot piece having its outer face inclined substantially at right angles to a line bisecting the angle subtended between said base and said foot piece, a draw-up member engaging the side bar and bearing against said inclined face, together with a second draw-up member passing beneath the lower flange of the side bar, said bracket base having a slotted portion through which said second draw-up bolt passes and affording means for the angular adjustment of the bracket around an axis formed by said first draw-up bolt.

15. A device for securing a bumper against a flanged chassis frame, said device comprising a bolt having a hook end adapted to pass around the flange of the frame bar, and an associated draw-up member engaging the opposite end of the bolt to clamp the latter in position, and exerting its effort in a direction subdividing the angle subtended between the body and flange of the frame bar.

16. A device for securing a bumper against a flanged chassis bar, said device comprising a bolt having a hook end which passes around the flange of the frame bar and engaging the body of the latter, and an associated draw-up member engaging the opposite end of the bolt to clamp the latter in position, and exerting its effort in a direction subdividing the angle subtended between the body and flange of the frame bar.

17. A device for securing a bumper against a flanged chassis frame bar, said device comprising a bolt having a hook end which passes around the flange of the frame bar, the opposite end of the bolt being offset from the shank of the latter, together with an associated draw-up member engaging said offset end of the bolt to clamp the latter in position and exerting its effort in a direction subdividing the angle subtended between the body and flange of the frame bar.

18. A device for securing a bumper against a flanged chassis frame bar, said device comprising a frame bar engaging member having an offset draw-up end, and an associated member engaging said offset end to clamp said engaging member to the bar, and exerting its effort in a direction subdividing the angle subtended between the body and the flange of the frame bar.

19. In combination with a construction such as specified in claim 18, an abutment member bearing against the frame and coöperating with said engaging and draw-up members, and having an abutment face lying at right angles to the direction of the thrust of the draw-up member and presented to the latter.

20. A device for securing a bumper against a flanged chassis frame bar comprising a bolt having a hook end engaging the bar, and having its opposite end offset from the body of the shank of the bolt, and a draw-up member engaging said offset end to clamp the bolt rigidly to the bar.

21. In combination with a construction such as specified in claim 20, a bar engaging abutment member having a face lying at right angles to the offset end of the bolt and presented to the bearing face of the draw-up member, substantially as described.

In testimony whereof I have signed my name to this specification.

RICHARD T. NEWTON.